United States Patent Office 3,794,507
Patented Feb. 26, 1974

3,794,507
MODIFIED ALKALI METAL HEXATITANATE AND PROCESS OF PRODUCING SAME
Gerhard Winter and Manfred Mansmann, Krefeld, Germany, assignors to Bayer Aktiengesellschaft, Leverkusen, Germany
No Drawing. Filed Sept. 26, 1972, Ser. No. 292,443
Claims priority, application Germany, Sept. 29, 1971,
P 21 48 600.0
Int. Cl. C09c 1/36
U.S. Cl. 106—299        19 Claims

ABSTRACT OF THE DISCLOSURE

Fibrous modified alkali metal hexatitanates characterized by a content of polyvalent metal ions in an amount of from 0 to 10% by weight of polyvalent metal and by a content of phosphate and/or arsenate ions in an amount of from 0.02 to 5% by weight of $P_2O_5$ and/or $As_2O_5$, based on the weight of titanium dioxide in the alkali metal hexatitanate, and process of producing the same by reacting a titanium compound with an alkali metal compound which reacts basically, in the presence of a mineralizer at a temperature of from 700 to 1200° C. and in the presence of phosphates and/or arsenates in an amount of from 0.5 to 10% by weight, based on the weight of the dry reaction mixture, and the utility thereof as pigments, insulating materials, catalysts and catalyst supports.

---

This invention relates to modified alkali metal hexatitanate pigments in fibrous form and to a process for their production by reacting titanium compounds with alkali metal compounds which react basically under the reaction conditions at temperatures in the range of from 700 to 1200° C.

Water-insoluble alkali metal titanates in fibrous form are suitable for various purposes, depending upon the size of the fibres. Fibres with a diameter of from about 0.1 to $0.3\mu$ have a pigment character and can be used as white pigments. There are also other fields of application, for example they can be used as fillers or even for the production of lubricants in admixture with oils. Alkali metal hexatitanates of the composition $M_2O \cdot 6TiO_2 (=M_2Ti_6O_{13})$ are more suitable for a number of these applications than titanates richer in alkali metal, for example, the tetra-, tri- or di-titanates, because the latter become chemically more active, more unstable and more sensitive to hydrolysis with increasing alkali metal content.

Fibrous alkali metal titanates having particle sizes in the pigment range can be used for pigmenting paper. It is preferred to use alkali metal hexatitanates for this purpose because they have a relatively high refractive index, amounting to substanially 2.3 in the case of $K_2Ti_6O_{13}$, for example, which is of considerable importance to the hiding power and tinting strength and because they are able, by virtue of their fibrous form, to mat with the cellulose fibres of the paper pulp and to remain therein during filtration (high retention), whilst spherical pigment particles are washed out much more easily. This accounts for the surprising fact that a paper pigmented with $K_2Ti_6O_{13}$, for example, has a higher hiding power than a paper in which an equivalent quantity of anatase was used for pigmenting although at $n=2.5$ the refractive index of anatase is higher than that of the potassium hexatitanate.

Alkali metal polytitanates have been known for some considerable time. According to United States patent specification No. 1,929,521 they can be produced by heating an intimate mixture of a titanium compound with a basically reacting alkali compound to a temperature of below 800° C. to more than 1000° C.

It is known that fibrous alkali metal polytitanates can be produced by high-pressure hydrothermal processes and melting processes.

DAS 1,252,645 relates to a process for the production of water-insoluble alkali metal titanates in fibrous form by calcining a solid reaction mixture of a basic, oxyen-containing alkali compound and an oxygen-containing titanium compound. It is possible to control the particle size by regulating the temperature. Thus, calcination is carried out at temperatures of from 600 to 850° C. to produce alkali metal titanate fibres in the colloidal particle size range (particle diameter 0.005 to 0.1 micron), at temperatures of from 850 to 975° C. to produce pigment particles (particle diameter 0.1 to 0.6 micron) and at temperatures of from 975 to 1150° C. to produce insulating or strengthening fibres (particle diameter 0.6 to 3 microns). It is preferred to add from 10 to 50% of alkali metal chloride to the reaction mixture to produce the pigmentary alkali metal titanate, in which case the reaction takes from 0.75 to 4 hours at 850 to 975° C.

However, the dependence of the particle size or, more precisely, the fibre diameter upon temperature involves certain disadvantages. For example, to produce a pigment having favorable optical properties, the particle size distribution is preferably within very narrow limits around the optimum value, any oversized or undersized particles resulting in a marked decrease in the optical performance. In the case of fibrous alkali metal hexatitanates, the fibrous particles should be as close as possible to the optimum diameter of substantially 0.3 micron which, in the conventional process, can only be achieved by keeping to a very narrow temperature range for all the particles. In practice, these conditions can only be achieved at considerable expense.

The present invention relates to modified fibrous alkali metal hexatitanates characterized by a polyvalent metal ion content of from 0 to 10% by weight of metal, and by a phosphate and/or arsenate ion content of from 0.02 to 5% by weight of $P_2O_5$ and/or $As_2O_5$, based on the $TiO_2$ in the alkali metal hexatitanate.

The modified alkali metal hexatitanates preferably contain the polyvalent metal ions in quantities of from 0.05 to 5% by weight of metal and the phosphate and/or arsenate ions in quantities of from 0.05 to 3% by weight of $P_2O_5$ and/or $As_2O_5$, based on the $TiO_2$ present in the alkali metal hexatitanate.

Examples of suitable polyvalent metal ions include the alkaline earth metals magnesium, calcium, strontium and barium, preferably calcium, and also others such as aluminium, zinc, cadmium, manganese, the transition metals, preferably iron, cobalt and nickel, and the rare earth metals.

In addition, the arsenates and phosphates can also be combined with fluorides of polyvalent metals. For example, it is possible to use the fluorides of the alkaline earth metals $YF_3$, $LaF_3$, $TiF_4$, $ZrF_4$, $ZnF_2$, $CdF_2$, $AlF_3$, $CeF_3$, $CeF_4$, $ThF_4$, fluorides of the lanthanides $SnF_2$, $PbF_2$, $BiF_3$, $UF_4$, $CoF_2$, $CrF_3$, $MnF_2$ in pure form, in admixture or even in the form of complex fluorides for example $K_2ZrF_6$, $Na_3AlF_6$ or $Na_3FeF_6$.

Where the arsenates and/or phosphates are combined with the polyvalent metal fluorides, the modified fibrous alkali metal hexatitanates have an additional fluorine ion content. In general, the fluorine content is in the range of from 0.05 to 10% by weight, based on $TiO_2$ in the alkali metal hexatitanate. Relatively low concentrations of from 0.05 to 3% by weight of fluorine are preferred.

The invention also relates to a process for producing the modified fibrous alkali metal hexatitnates by reacting a titanium compound with an alkali metal compound which reacts basically under the reaction conditions in the presence of a mineralizer at a temperature in the range of from 700 to 1200° C., wherein the reaction is carried out in the presence of arsenates and/or phosphates used in quantities of from 0.1 to 15% by weight of $As_2O_5$ and/or $P_2O_5$ and preferably in quantities of from 0.5 to 10% by weight, based on the dry reaction mixture.

According to the present invention, the fibrous alkali metal hexatitanate pigments are produced by mixing $TiO_2$ or titanium compounds which can be converted into $TiO_2$ under the reaction conditions with an alkali metal compound which reacts basically under the reaction conditions and heating the resulting mixture to the reaction temperature in the presence of mineralizers and modifiers. The fibrous alkali metal hexatitanate pigment is then recovered by washing the reaction cake.

In addition to $TiO_2$ and its hydrates, examples of titanium compounds which can be converted into $TiO_2$ under $K_2[TiO(C_2O_4)_2]$, titanium metal, TiC, TiN, $TiS_2$, titanium halides, complex titanium halides, titanium subhalides, organic titanium salts, titanic acid esters and other organic titanium compounds. It is preferred to employ the $TiO_2$-hydrolysates sludge which accumulates during pigment production by the hydrolysis of titanium sulphate. Examples of alkali metal compounds which react basically under the reaction conditions include alkali metal oxides, peroxides, hydroxides, acetates, oxalates, hydrogen tartrates, carbonates, bicarbonates, cyanides, thiocyanates, nitrates, nitrites, amides, sulphides, polysulphides, hydrides and iodides. In the context of the invention, alkali metal compounds are the corresponding compounds of sodium, potassium, rubidium and cesium, preferably those of sodium and potassium. KOH, $K_2CO_3$, $Na_2CO_3$, $NaHCO_3$, $KHCO_3$ or NaOH are most preferably used.

The ratio of the alkali metal compound to the titanium compound to be adjusted in the reaction mixture, expressed as the ratio of $M_2O:TiO_2$, can amount to a value within the range of from 1:3 to 1:7. It is preferred to use an $M_2O:TiO_2$ ratio of from 1:5 to 1:6. In every case, alkali metal hexatitanates in fibrous form are formed under the reaction conditions specified, the fibre diameter amounting on average to substantially 0.3 micron whilst the fibres have lengths of from 1 to 50 microns.

Particular importance is attached to the modifiers in the process according to the invention because without them it is not possible to obtain controlled fibre formation in the reaction mixture. In the presence of the fibre-forming modifiers, fibrous alkali metal titanates with pigment properties are obtained from a variety of different combinations of alkali metal and titanium compounds. In addition, the modifiers have a standardizing effect upon fibre formation so that, above a minimum temperature of substantially 700° C., it is always possible to obtain an optically equivalent fibrous pigment substantially independently of the reaction temperature. The fact that it is unaffected by fluctuations in temperature is a particular advantage of the process according to this invention. In addition, only pure alkali metal hexatitanates are formed under the reaction conditions and, furthermore, the fibre-forming modifiers promote a particularly rapid pigment formation. In most cases, mere heating to the reaction temperature is all that is required in order to form the alkali metal titanate pigments and there is no need for the reaction mixture to be held for prolonged periods at this temperature. By virtue of the modifiers used in accordance with the invention, pigment production can also be carried out at relatively low temperatures, thus the process is also economical in terms of energy.

Phosphates and/or arsenates represent suitable fibre-forming modifiers for the purposes of the invention. Examples of suitable substances include $Na_3AsO_4$, $Na_2HAsO_4$, $K_3AsO_4$, $K_4As_2O_7$, $As_2O_3$, $(NH_4)_3AsO_4$, $K_3PO_4$, $KPO_3$, $Na_2HPO_4$, $NaNH_4HPO_4$, $(NH_4)_3PO_4$, $P_2O_5$, $K_4P_2O_7$, which may be used either individually or in admixture with one another. In some cases, it is advantageous to combine these substances with fluorides of polyvalent metals.

In addition to the aforementioned alkali metal arsenates and/or phosphates, it is also possible to use arsenates and phosphates of polyvalent metals, in which case, the end product contains the corresponding polyvalent metals in addition to the arsenate and/or phosphate. Suitable polyvalent metals of this kind include the alkaline earth metals, magnesium, calcium, strontium, barium, preferably calcium, aluminum, zinc, cadmium and manganese, the transition metals, preferably iron, cobalt and nickel and also the rare earth metals. In some cases, it has proved to be advantageous to combine the alkali metal phosphates or arsenates in particular with fluorides of polyvalent metals. For example, it is possible to use the fluorides of the alkaline earth metals, $YF_3$, $LaF_3$, $TiF_4$, $ZrF_4$, $ZnF_2$, $CaF_2$, $AlF_3$, $CeF_3$, $CeF_4$, $ThF_4$, fluorides of the lanthanides, $SnF_2$, $PbF_2$, $BiF_3$, $UF_4$, $CoF_2$, $CrF_3$, $MnF_2$ in pure form, in admixture or even in the form of complex fluorides such as, for example $K_2ZrF_6$, $Na_3AlF_6$ or $Na_3FeF_6$. The modifiers are at least partly incorporated into the fibrous pigment during the reaction and, in this way, contribute towards a remarkable change in the properties. In addition to stabilization against light and an improvement in color in the case of white pigments, it is possible by combining the substances to obtain additional effects such as, for example, influencing the color, the length of the fibres, dispersibility or other physical or chemical properties. In general, the finished pigment is found after washing to contain the entire quantity of the polyvalent metal introduced as arsenate, phosphate and/or fluoride, whilst the anions can still be detected in proportions of from 10 to 70% by weight of the quantity introduced, depending upon the reaction temperature and the property of the substance used.

The alkali metal titanate pigments produced in accordance with the invention have densities in the range of from 3.30 to 3.40, depending upon the modifier used. The individual pigment fibres generally have a smooth surface so that the specific surfaces according to BET at 6 to 10 $m.^2/g.$ are relatively low.

The substances used as modifiers can be added either to the dry reaction mixture or in the form of aqueous solutions to an aqueous suspension of the reagents. The modifiers are generally present in concentrations of from 0.1 to 15% and preferably in concentrations of from 0.5 to 10%, the percentages being calculated on the sum of, for example, phosphate and fluoride or phosphate alone, based on the dry reaction mixture. The dry reaction mixture is composed of all the substances which participate in the reaction in anhydrous form.

In conjunction with the fibre-forming modifiers, the mineralizers used in accordance with the invention promote a particularly fast reaction of the reactants and a uniform development of the pigment fibres and increase the effectiveness of the modifiers. Suitable mineralizers include alkali metal salts of oxyacids of sulfur such as, for example, $Na_2SO_3$, $K_2SO_4$, $RbSO_4$, $CsSO_4$, $K_2S_2O_7$, $NaHSO_4$, $Na_2S_2O_5$ and $Na_2S_2O_3$, or alkali metal halides. In addition to the chlorides of the alkali metals, the fluorides NaF, KF, RbF, CsF, are also preferably used. Particularly favorable results are obtained where the alkali metal sulphates such as, for example, $Na_2SO_4$ and $K_2SO_4$, are combined with the alkali metal fluorides.

The concentration by weight of mineralizers in the reaction mixture is governed by the activity of the fibre-forming modifiers. Quantities as small as 3 to 30% are sufficient where particularly active modifiers, for example, $K_4P_2O_7$ are present, whilst in the case of less active modifiers it is best to use concentrations of from 20 to 40%, based on the dry reaction mixture. It is also possible to use higher concentrations without any adverse effect upon pigment formation, although concentrations of below 30% are preferred because then the reaction mixture remains dry even at reaction temperatures above the melting point of the mineralizer and the mixture does not cake. The mineralizers used are substantially involatile at the reaction temperature. Surprisingly, $K_2SO_4$, $Rb_2SO_4$ and $Cs_2SO_4$, for example, which have melting points considerably higher than 1000° C. are effective as mineralizers at temperatures as low as substantially 700° C. upwards.

The speed with which pigment formation takes place through cooperation between modifiers and mineralizers was demonstrated in a number of tests. A reaction mixture of $TiO_2$ (prepared by the hydrolysis of titanium tetrabutylate or titanyl sulphate) and $K_2CO_3$ in a molar ratio of 6:1, was heated for 120 minutes to 900° C., removed from the furnace and then dispersed in water; there were no signs of true fibre formation. In contrast a reaction mixture prepared in accordance with the invention from $TiO_2$, $K_2CO_3$ (molar ratio 6:1) with 20% of $K_2SO_4$, 3.1% of KF and 3.2% of $K_4P_2O_7$, was reacted in the same way by heating for 120 minutes to 900° C.; more than 95% of the mixture was found to consist of pigment fibres. In this case, there are almost no isometric particles at all whilst isometric particles and unreacted starting material are almost exclusively present in the former case.

To prepare the fibrous alkali metal hexatitanate pigment, a mixture of the various components is prepared and heated in a reaction furnace. The mixture can be prepared, for example, by grinding the components alkali metal compound, titanium compound, modifier and mineralizer together in dry form. If, by contrast, titanium dioxide sludges of the kind formed, for example, in the production of titanium dioxide by sulphate-hydrolysis, are used as starting materials, the remaining reactants are added to the sludge which is then stirred until a homogeneous distribution is obtained, after which a dry reaction mixture is prepared by drying in a screw, on a cylinder or by spray drying. For further preparation, the reaction mixture is then heated to the reaction temperature in furnaces of conventional design such as, for example, batch furnaces, rotary furnaces or shaft furnaces and optionally maintained at the reaction temperature for a while. The reaction can be carried out at temperatures in the range of from 700 to 1200° C., although it is preferably carried out at temperatures of from 800 to 1000° C. In general, there is no need for the reaction mixture to be maintained for prolonged periods at the reaction temperature on account of the fast reaction. In many cases, mere heating to the reaction temperature is sufficient to obtain a superior-grade pigment. Although relatively long residence times of up to substantially 5 hours do not have any adverse effect, there is generally no need to maintain the temperature for longer than 3 hours. On leaving the furnace the end product consists of matted pigment fibres which have a diameter in the range of from 0.2 to 0.5 micron, primarily substantially 0.3 micron, and a length of from 1 to 50 microns. In order to recover the pigment fibres, the reaction cake is size-reduced, washed with water and the pigment fibres filtered off. Before further use, the product can be dried, after-treated or otherwise worked up.

In addition to their pronounced fibre form, the pigments produced in accordance with the invention have a high optical performance and show particularly favorable retention values in paper. Accordingly, they are particularly suitable for opacifying papers. However, they can also be used for other applications, for example, in lacquers or for pigmenting plastics.

The same also applies as regards the colored products obtained by the process according to the invention. By incorporating certain metals or metal combinations, it is also possible to produce hexatitanates with hitherto unknown properties. Thus, in addition to optical effects, it is also possible to obtain special electrical and magnetic or catalytic effects. By reducing the products obtained in accordance with the invention, it is possible to obtain alkali metal titanates with a more or less large proportion of trivalent titanium. These titanium bronzes also show interesting optical, electrical, magnetic and even catalytic properties which can be influenced and varied within wide limits by the modifiers present in the starting material. The production of titanium bronzes from the modified alkali metal hexatitanates according to the invention is carried out by methods known per se of the kind described, for example, in Nature 192, Nov. 11, 1961, 551–552.

The process according to the invention is further illustrated by the following examples:

EXAMPLE 1

16.72 g. of a $TiO_2$-hydrolysate with a $TiO_2$ content of 92.8%, prepared from $Ti(OC_4H_9)_4$, were mixed in a mortar with 4.48 g. of $K_2CO_3$ (molar ratio of $K_2CO_3$:$TiO_2$=1:6) following the addition of 5.0 g. of $K_2SO_4$, 0.91 g. of $K_4P_2O_7$ and 1.44 g. of KF. The completed reaction mixture contained 56.8% of $TiO_2$, 16.4% of $K_2CO_3$, 18.3% of $K_2SO_4$, 5.25% of KF and 3.31% of $K_4P_2O_7$ based on dry material. The mixture was poured into a crucible and heated for 120 minutes to 850° C. and another portion for 120 minutes to 900° C. The finished reaction products were poured into water, crushed with a mortar and then rubbed into a paste. The resulting products were then filtered and washed free from salts. A small quantity of each product was resuspended in water by means of an intensive stirrer and examined under an electron microscope. More than 95% of each specimen consisted of fibrous material, the individual fibres having diameters in the range of from 0.2 to 0.4μ. The specimen heated to 850° C. had fibre lengths of from 3 to 30μ whilst the specimen heated to 900° C. had fibre lengths of from 5 to 45μ. Identification by X-ray photography showed that both products were potassium hexatitanate $K_2Ti_6O_{13}$.

To measure the optical performance of this pigment, its lightening power was determined in accordance with DIN 54 192. In this test, 0.15 g. of the pigment to be tested, ground for 15 minutes, is mixed with 5 g. of a blue paste in a color grinding mill and the lightening obtained is determined photometrically from the degree of remission at 560±10 nm. The value for the lightening power can then be read off from a calibration curve. A comparison lithopone with a lightening power of 100 established as the reference value was used as the comparison white pigment for this test.

The reaction mixture heated for 120 minutes to 850° C. produced a fibrous pigment with a lightening power of 290. Heating for 120 minutes to 900° C. gave a pigment with a lightening power of 275.

To determine the retention of the fibrous $K_2Ti_6O_{13}$ pigment in paper, the following test was carried out: 0.35 g. of the pigment was dispersed for 1 minute in 620 ml. of water by means of an intensive stirrer. 350 ml. of a bleached sulphite cellulose sludge containing 10 g. of celluolse per litre were added to this suspension and the cellulose residues left in the vessel were washed out with another 30 ml. of water so that 1 litre of paper mache with pigment was obtained. The paper was produced in a paper plating machine which consisted of a circular sieve having a sieve surface of 326 cm.² for a mesh width of 0.1 mm. with 3600 meshes per cm.², on top of which was placed a cylindrical vessel. A ventilating and evacuation unit was arranged below the sieve. 3 litres of water were introduced into the vessel arranged on top of the sieve. Since all the pipes were closed, the water did not run off through the sieve. The pigment-containing paper mache was then added to the water and the ventilating unit switched on so that air was introduced upwards through the sieve under pressure and the mixture above the sieve was thoroughly mixed. After 15 seconds, ventilation was switched off and the mass was left to settle for 15 seconds. The liquid was then removed under suction followed by the continued application of suction for 1 minute.

The sheet of paper on the sieve was dried by means of a vacuum press heated to 80–90° C. In order to determine the quantity of pigment retained, the paper was burnt to ashes and the burning residue weighed. The burning residue in percent, based on the quantity used, gives the retention.

The fibrous $K_2Ti_6O_{13}$ pigment produced by heating for 120 minutes to 900° C. gave a retention of 61%. A standard commercial anatase pigment with isometric pigment particles used under the same test conditions gave a retention of 8.2%. A commercially available fibrous potassium titanate pigment gave a retention of 43%.

EXAMPLE 2

69.3 g. of titanium tetrabutylate, 7.05 g. of $K_2CO_3$, 5.85 g. of $K_2SO_4$, 0.95 g. of $K_4P_2O_7$ and 1.51 of KF were ground together in a ball mill. The resulting paste was dried at 120° C. in a drying cabinet, subsequently pulverized and poured into an $Al_2O_3$ crucible. The reaction mixture contained $K_2CO_3$ and titanium tetrabutylate in a molar ratio of 1:4 and (titanium tetrabutylate expressed as $TiO_2$), 18.5% of $K_2SO_4$, 4.8% of KF and 3.0% of $K_4P_2O_7$ based on dry material. It was heated for 160 minutes to 1100° C. and the crucible removed from the furnace. A friable, white mass had formed, being suspended in water and distributed by stirring with an intensive stirrer. After filtration and washing, it was possible to obtain a white, compressible product readily deprived of its colour of which 95% consisted of microscopically fine needles. The needles had diameters in the range of from 0.2 to 0.4 microns and lengths of from 5 to 20 microns. They were identified by X-ray photography as $K_2Ti_6O_{13}$.

Another part of the reaction mixture was heated for 120 minutes to 900° C. In this case, too, more than 95% fine fibrous pigment particles with a lightening power of 285 were formed.

EXAMPLE 3

The hydrolysis sludge accumulating during the hydrolysis of titanium sulphate solutions in the large-scale production of $TiO_2$ pigments, was used as the $TiO_2$ source. The sludge was filtered and washed. It still contained 8% of $H_2SO_4$ in combined form, based on $TiO_2$. Solid $K_2CO_3$ was added to the sludge so that, following neutralization of the combined $H_2SO_4$, a $K_2CO_3$: $TiO_2$ ratio of 1:6 was obtained. $K_2SO_4$ was used as the mineralizer in the quantities indicated in Table 1. $K_4P_2O_7$, $K_2HPO_4$ and $K_3AsO_4$ were used as the modifiers. A mineralizer and modifiers were added dropwise to the sludge in the form of aqueous solutions, mixed by stirring and the entire suspension subjected to spray drying at 300° C. The powdered reaction mixture obtained was subsequently heated as indicated in Table 2. After heating to the reaction temperature, the reaction products were quenched, dispersed in water, washed and filtered. Some of the pigments obtained were resuspended in water and examined under an electron microscope for the proportion of fibrous pigment particles present. Lightening power was measured on some more of the pigments as described in Example 1.

The product obtained in accordance with 3d was investigated by analysis. It was found to have an As-content of 0.46% of $As_2O_5$.

EXAMPLE 4

The same hydrolysate sludge used in Example 3, washed and filtered, was used as the $TiO_2$ source. It still contained 8% of combined $H_2SO_4$, based on $TiO_2$, and was employed in the form of a 28.4% suspension. 19.5 g. of $Na_2CO_3$, 21.5 g. of $K_2SO_4$, 3.45 g. of $K_4P_2O_7$ and 5.45 g. of KF were added to 208 g. of this suspension which was then stirred until the salts had completely dissolved. By neutralizing the $H_2SO_4$ 6.84 g. of $Na_2SO_4$ were additionally formed so that the reaction mixture now contained 53.3% of $TiO_2$, 13.02% of $Na_2CO_3$ $$(Na_2CO_3:TiO_2=1:5.44)$$

19.45% of $K_2SO_4$, 6.18% of $Na_2SO_4$, 4.93% of KF and 3.12% of $K_4P_2O_7$, based on the dry material. The mixture was concentrated to dryness by evaporation in a rotary vacuum evaporator and then heated for 3 hours to 1100° C. The reaction product was removed from the furnace while still hot, dropped into water and further processed as described in Example 1. It could be seen under an electron microscope that substantially 90% of the product formed consisted of fine fibres which had matted together. The fibres had an average diameter of around 0.3 micron and were about 3 to 8 microns long. They were identified by X-ray photography as mixed crystals with the composition $(K\ Na)_2Ti_6O_{13}$. A K:Na ratio of 1.87:1 was determined by analysis, corresponding to the formula $K_{1.3}Na_{0.7}Ti_6O_{13}$.

EXAMPLE 5

19.9 g. of $Na_2CO_3$, 20 g. of $Na_2SO_4$, 3.8 g. of $Na_4P_2O_7$ and 5.4 g. of NaF were added to 223.4 g. of 26.9% $TiO_2$-hydrolysate (as in Example 3) corresponding to 60.1 g. of $TiO_2$. By neutraliizng the $H_2SO_4$ in the $TiO_2$ hydrolyzate another 6.95 g. of $Na_2SO_4$ were formed so that suspension contained 54.2% of $TiO_2$, 13.22% of $Na_2CO_3$ $(Na_2CO_3:TiO_2=1:5.4)$, 24.3% of $Na_2SO_4$, 3.42% of $Na_4P_2O_7$ and 4.86% of NaF, based on the dry material. The suspension was homogenized by stirring and, after all the salts had completely dissolved, dried on a cylinder dryer. The dried reaction mixture was subsequently heated for 80 minutes to 900° C. and cooled. The product was further worked up as described in Example 1. The washed substance consisted of heavily matted fibrous pigment particles which were identified by X-ray photography as $Na_2Ti_6O_{13}$. This product was found to have a lightening power of 300. The product contained 0.14% of $P_2O_5$, based on $TiO_2$ in the $Na_2Ti_6O_{13}$.

EXAMPLE 6

31.0 g. of $KNO_3$, 20.0 g. of $K_2SO_4$, 2.86 g. of $K_4P_2O_7$ and 4.54 g. of KF were added to 182 g. of the $TiO_2$ hydrolysate described in Example 3, containing 49.0 g. of $TiO_2$, and the resulting product was stirred until the salts had completely dissolved. The suspension was dried at 200° C. in a vacuum drying cabinet, some of the $KNO_3$

TABLE 1

| Test | Starting materials, grams | | | | | Composition of the reaction mixture, based on dry material, percent | | | | |
|---|---|---|---|---|---|---|---|---|---|---|
| | $TiO_2$ | $K_2CO_3$ | $K_2SO_4$ | Modifier | | $TiO_2$ | $K_2CO_3$ | $K_2SO_4$ | Modifier | |
| a | 62.1 | 24.9 | 11.2 | $K_4P_2O_7$ | 1.45 | 61.22 | 17.64 | 19.71 | $K_4P_2O_7$ | 1.43 |
| b, c | 69.9 | 28.0 | | $K_2HPO_4$ | 17.2 | 59.6 | 17.2 | 8.5 | $K_2HPO_4$ | 14.7 |
| d | 62.1 | 24.9 | 11.2 | $K_3AsO_3$ | 4.52 | 59.4 | 17.13 | 19.14 | $K_3AsO_3$ | 4.32 |

TABLE 2

| Test | Heating time to reaction temperature (min.) | Residence time at reaction temperature (hr.) | Reaction temperature, °C. | Percent proportion of pigment fibres | Lightening power |
|---|---|---|---|---|---|
| a | 120 | 1 | 1,000 | 95 | 280 |
| b | 100 | | 1,000 | 95 | 300 |
| c | 100 | 1 | 1,000 | 95 | 290 |
| d | 120 | | 1,000 | 90 | 270 | being decomposed by the sulphuric acid present in the $TiO_2$ hydrolysate to form $K_2SO_4$. Taking this reaction into account, the dried reaction mixture had the following composition: 46.1% of $TiO_2$, 21.6% of $KNO_3$ (molar ratio $K_2O:TiO_2=1:5.4$), 25.3% of $K_2SO_4$, 2.69% of $K_4P_2O_7$ and 4.27% of KF. This reaction mixture was reacted by different kinds of heat treatment into fibrous $K_2Ti_6O_{13}$-pigment:

(a) The product was heated to 750° C., maintained at this temperature for 3 hours and then dispersed in water, washed and dried. The fibrous $K_2Ti_6O_{13}$ pigment formed had a lightening power of 285. Its retention in paper amounted to 65.7%.

(b) The reaction mixture was heated to 900° C. and maintained at this temperature for 3 hours. After it had been worked up and purified, the fibrous $K_2Ti_6O_{13}$ pigment was found to have a lightening power of 300.

(c) Calcination was carried out by heating for 120 minutes to 1000° C. Thereafter the product was immediately cooled and worked up as in (a). The fibrous $K_2Ti_6O_{13}$ pigment was found to have a lightening powder of 295. The product contained 0.2% of $P_2O_5$, based on $TiO_2$ in the $K_2Ti_6O_{13}$.

EXAMPLE 7

24.2 g. of $K_2CO_3$, 20 g. of $K_2SO_4$, 3.9 g. of $K_4P_2O_7$ and 0.735 g. of $NH_4F$ were added to 55.8 g. of $TiO_2$ in the form of $TiO_2$ ydrolysate (according to Example 3) and stirred until the salts had completely dissolved. By introducing an aqueous solution containing 2.34 g. of $Ca(NO_3)_2 \cdot 4H_2O$ dropwise with stirring, 0.775 g. of $CaF_2$ were precipitated in the suspension. The mixture was concentrated by evaporation to dryness in a rotary vacuum evaporator. The reaction mixture contained 52.5% of $TiO_2$, 16.8% of $K_2CO_3$ ($K_2CO_3:TiO_2=1:5.4$), 26.3% of $K_2SO_4$, 3.7% of $K_4P_2O_7$ and 0.73% of $CaF_2$, based on dry material. The reaction mixture was heated for 120 minutes to 900° C., cooled, dispersed, washed and dried. 90% of the product consisted of a fibrous $K_2Ti_6O_{13}$ pigment with a lightening power of 280. The product contained 0.92% of $P_2O_5$ and 0.71% of Ca, based on $TiO_2$ in the $K_2Ti_6O_{13}$, and had a fluoride content of 0.3%.

EXAMPLE 8

62.1 g. of $TiO_2$ (in the form of $TiO_2$ hydrolysate as in Example 3), 24.9 g. of $K_2CO_3$ and 11.2 g. of $K_2SO_4$ were mixed together. A solution containing 7.5 g. of $Al(NO_3)_3 \cdot 9H_2O$ and 7.2 g. of $K_4P_2O_7$ was added dropwise with stirring to the suspension. After drying, the mixture was heated for 180 minutes to 1000° C. and worked up as described in Example 2. The $K_2Ti_6O_{13}$ pigment obtained was investigated by analysis. It had an Al content of 0.8% of a $P_2O_5$ content and 2.47%, based on the $TiO_2$ in the $K_2Ti_6O_{13}$.

What is claimed is:

1. A modified fibrous alkali metal hexatitanate characterized by a content of polyvalent metal ions in an amount of from 0 to 10% by weight of polyvalent metal and by a content of ions selected from the group consisting of phosphate ions, arsenate ions and mixtures thereof in an amount of from 0.02 to 5% by weight of $P_2O_5$, $As_2O_5$ or a mixture thereof, said amounts being based on the weight of $TiO_2$ in the alkali metal hexatitanate.

2. The modified fibrous alkali metal hexatitanate of claim 1 having a content of polyvalent metal ions in an amount of 0.05 to 5% by weight of polyvalent metal and a content of irons selected from the group consisting of phosphate ions, arsenate ions and mixtures thereof in an amount of from 0.05 to 3% by weight of $P_2O_5$, $As_2O_5$ or a mixture thereof.

3. The modified fibrous alkali metal hexatitanate of claim 1 wherein the polyvalent metal ions are ions of calcium, cadmium, aluminum or a mixture thereof.

4. The modified fibrous alkali metal hexatitanate of claim 1 having a content of fluorine ions in an amount of from 0.05 to 3% by weight of fluorine, said amount being based on the weight of $TiO_2$ in the alkali metal hexatitanate.

5. A process for producing a modified fibrous alkali metal hexatitanate which comprises reacting titanium dioxide or a titanium compound which yields titanium dioxide under the process reaction conditions, with at least one alkali metal compound of sodium, potassium, rubidium or cesium which reacts basically under the process conditions in the presence of a reaction accelerating amount of a mineralizer which is an alkali metal salt of an oxyacid of sulphur of sodium, potassium, rubidium or cesium and in the presence of a phosphate, arsenate or a mixture thereof in an amount of from 0.1 to 15% by weight of $P_2O_5$, $As_2O_5$ or a mixture thereof, based on the weight of the dry reaction mixture, at a temperature of from 700 to 1200° C.

6. The process of claim 5 wherein said phosphates, arsenates and mixtures thereof are selected from the group consisting of $K_4P_2O_7$, $K_4As_2O_7$ and mixtures thereof.

7. The process of claim 5 wherein titanium dioxide or a hydrate thereof is employed.

8. The process of claim 5 wherein titanium dioxide hydrolysate sludge accumulating during the technical hydrolysis of titanium sulphate is employed.

9. The process of claim 5 wherein said alkali metal compound is an alkali metal hydroxide, alkali metal carbonate, alkali metal hydrogen carbonate or a mixture thereof.

10. The process of claim 5 wherein the alkali metal compound is employed in a molar ratio of alkali metal oxide to titanium compound, calculated as titanium dioxide, of 1:3 to 1:7.

11. The process of claim 5 wherein the alkali metal compound is employed in a molar ratio of alkali metal oxide to titanium compound, calculated as titanium dioxide, of 1:5 to 1:6.

12. The process of claim 5 wherein the reaction is carried out in the presence of a polyvalent metal fluoride in an amount of from 0.1 to 15% by weight, based on the weight of the dry reaction mixture.

13. The process of claim 12 wherein said polyvalent metal fluoride is calcium fluoride, cadmium fluoride, aluminum fluoride or a mixture thereof.

14. The process of claim 5 wherein the reaction is carried out in the presence of a polyvalent metal fluoride in an amount of from 0.5 to 10% by weight, based on the weight of the dry reaction mixture.

15. The process of claim 14 wherein said polyvalent metal fluoride is calcium fluoride, cadmium fluoride, aluminum fluoride or a mixture thereof.

16. The process of claim 5 wherein said reaction accelerating amount is from 3 to 40% by weight, based on the weight of the dry reaction mixture.

17. The process of claim 5 wherein said reaction accelerating amount is from 5 to 30% by weight, based on the weight of the dry reaction mixture.

18. The process of claim 5 wherein said phosphate or arsenate is substituted partially by an alkali metal fluoride.

19. The process of claim 5 wherein said temperature is from 800 to 1000° C.

References Cited

UNITED STATES PATENTS

| | | | |
|---|---|---|---|
| 3,505,088 | 4/1970 | Lugenslard et al. | 106—308 B |
| 3,513,007 | 5/1970 | Ledere | 106—300 |
| 3,560,234 | 2/1971 | Holbern | 106—300 |

DELBERT E. GANTZ, Primary Examiner

J. V. HOWARD, Assistant Examiner

U.S. Cl. X.R.

106—300, 308 B, 309